Patented May 23, 1933

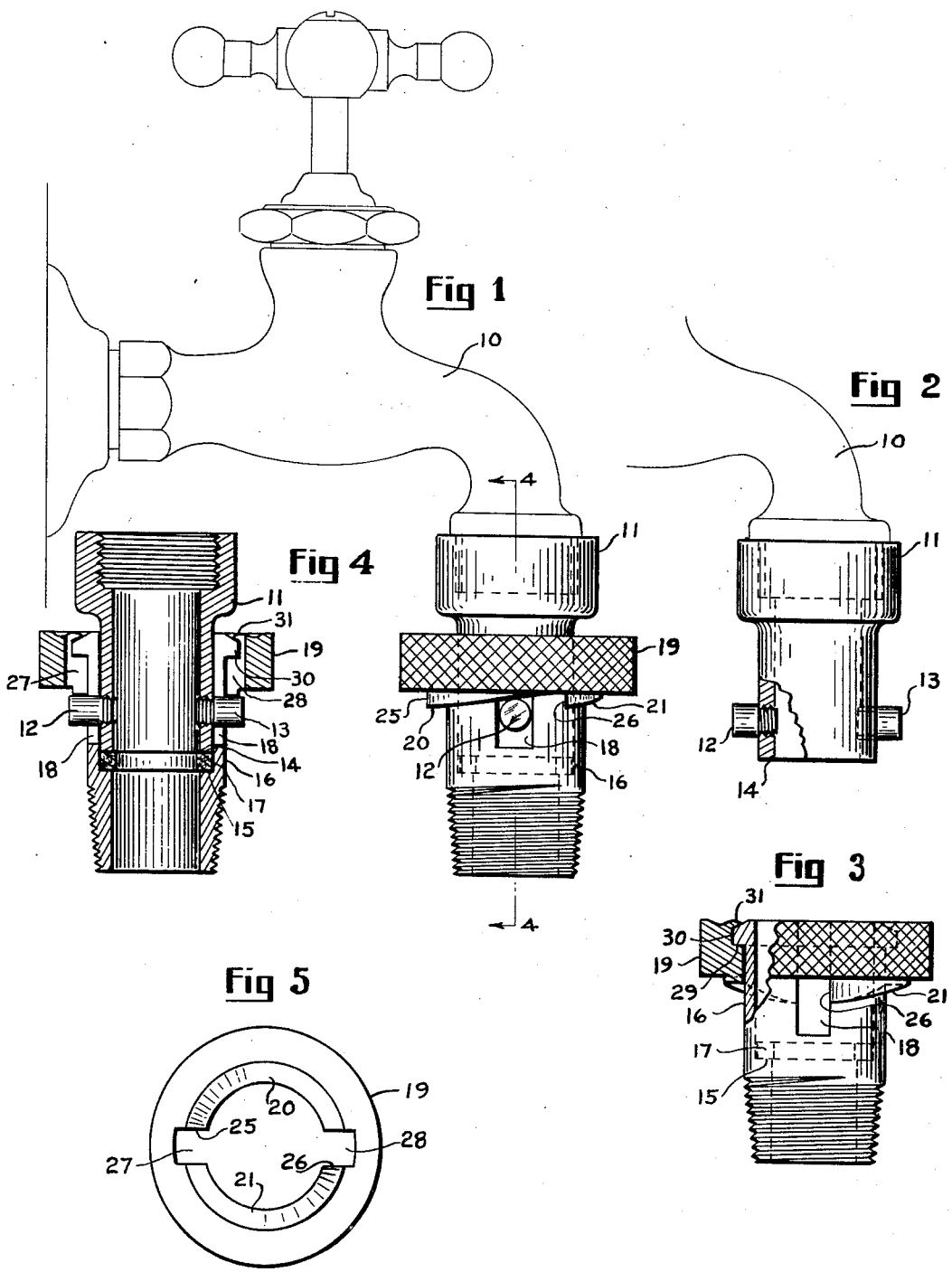

1,910,152

UNITED STATES PATENT OFFICE

OGDEN FRANK DURFEY, OF DARIEN, CONNECTICUT

PIPE COUPLING

Application filed October 18, 1932. Serial No. 638,397.

This invention relates to a pipe coupling, and more especially a coupling of the type adapted for use with the ordinary garden hose.

Whereas the art of pipe coupling has been very highly developed, there has been no pipe coupling which has achieved great commercial success, due primarily to the expensive manner in which a good coupling must now be manufactured, and also to the general inability of the various parts to wear well because of the inherent relationship of the parts utilized.

An object of my invention is to arrange for a quick pipe coupling which will not only be cheap to manufacture and assemble, because of a minimum number of parts, but which will operate in a very fine and efficient manner to secure a quick coupling, and due to the inherent arrangement of the parts, will be long lasting.

Fundamentally, my invention comprises a pair of coupling members having a pair of cooperative sealing portions between which is adapted to lie a washer of some material such as rubber or felt. These couplings have a pin and slot arrangement so that when joined, they are capable of movement only in a longitudinal or vertical direction relatively to each other, so that no possible movement other than a compressing movement is possible relatively to the packing, which will be the washer already indicated. The pins of the pin and slot connection are cooperative with a cam member rotatable relatively to both coupling members and secured against endwise movement in at least one direction on one of said coupling members for drawing the two closer together by cams cooperating with the pins.

Referring now to the drawing, Fig. 1 is a front view of my invention applied to a spigot. Fig. 2 is a view of the upper or pin carrying coupling member secured to the spigot. Fig. 3 is a partial sectional view of the lower or slotted coupling member carrying the cam. Fig. 4 is a section of the parts of Fig. 1. Fig. 5 is a bottom view of the camming member.

Referring now more particularly to the drawing, reference numeral 10 indicates a spigot to which is preferably secured one of the coupling members forming my invention and indicated by reference numeral 11. This member, which I shall term the upper member, may be secured to spigot 10 by screw threads, or may even be made integral therewith, as may be desired, this part of the construction not being a part of my invention. The member 11 carries a pair of pins 12 and 13 which are screw threaded into the main body 11 so as to be readily removable and replaceable when worn.

The member 11 also has a sealing seat 14 which cooperates with a seat 15 of the lower coupling member 16 shown more particularly in Fig. 3. Between the sealing seats 14 and 15, there is adapted to be placed a washer 17 which may be made of any particular material depending upon the fluid or gas which is to flow through the coupling. For water, the washer will preferably be rubber.

The member 16 is equipped with a pair of diametrically opposite slots 18 which cooperate with the pins 12 and 13 so that when the member 11 is allowed to enter the member 16 for coupling operation, the pins 12 and 13 will ride in the slots 18 and the two members will have a pure longitudinal movement only, which movement will move the seats 14 and 15 into cooperative sealing relationship with the aid of washer 17, as will be readily understood.

This cooperative movement between the members 11 and 16 will naturally require further means to maintain the members in their assembled relation, but the pin and slot relation will be capable of preventing any shearing or rotary movement between the seating portions 14 and 15 so as to protect the packing 17. For drawing the two members 11 and 16 closer together, and thus maintaining them, I utilize a camming member 19 equipped with a pair of diametrically opposed cams 20 and 21 which are adapted to cooperate respectively with pins 12 and 13. The cam member 19 is slipped on from the bottom of the lower coupling member 16 looking at Fig. 3, until shoulder 29 thereof abuts the shoulder 30 of the member 16. A portion 31 of the cam member 19 is then staked over the upper surface of the member 16 so as to maintain the two in assembled relation thereafter.

The cam member 19 is slotted at 27 and 28, and may be positioned with those slots aligned with the slots 18 whereupon the member 16 and its cam 19 may be slipped readily over the member 11 with the cam 19 positioned over the pins 12 and 13 as illustrated in Fig. 1. It is obvious that clockwise rotation of the cam 19 will then serve to force the member 19, and through its shoulder 29, the member 16 into a binding relation with the member 11 as will be quite clear.

It will also be seen readily that the relation of the cams 20 and 21 to the pins 12 and 13 is such that when the member 19 is rotated to release the members 11 and 16 from each other by aligning the slots 27 and 28 of cam 19 with the pins 12 and 13, the end shoulders 25 and 26 of the cams will act to limit their releasing rotation so as to align readily the slots in the cam 19 with the pins to permit rapid withdrawal.

While I have thus described a particular detailed modification of my invention, it should be understood that many variations of the same may readily be arranged without departing from the scope and spirit of the invention as indicated in the appended claims.

I claim:

1. A pipe coupling comprising two separate cylindrical coupling members, one of said members being nested within the other and bearing on the inner cylindrical surface of the outer member for a substantial length thereof so as to form a firm union therewith, a seat in said outer member into which the end of the bearing surface of said first member seats against a sealing washer, a pair of radial pins projecting from the said bearing surface of the inner member near its seating end, said pins being adapted to fit in vertical slots in the outer member and to extend substantially beyond the periphery of said outside member, a cam member rotatable on said outside member and having cam means cooperable with said pins to force said inner and outer members into seating relationship.

2. A pipe coupling comprising two separate cylindrical coupling members, one of said members being nested within the other and bearing on the inner cylindrical surface of the outer member for a substantial length thereof so as to form a firm union therewith, a seat in said outer member in which the end of the bearing surface of said first member seats against a sealing washer, a pair of removable radial pins screwed into the said bearing surface of the inner member near its seating end, said pins extending from within the outside member through slots in said member to points substantially beyond the periphery of said outside member, a cam member rotatable on said outside member and having an internal shoulder cooperating with a shoulder on said outside member, and cam means on said member cooperable with said pins to force said inner and outer members into seating relationship.

Signed at Stamford, in the county of Fairfield, and State of Connecticut.

O. FRANK DURFEY.